(12) United States Patent
Schäfer (10) Patent No.: US 8,656,716 B2
(45) Date of Patent: Feb. 25, 2014

(54) ACTUATOR FOR AN ACTIVE HOOD

(75) Inventor: Joachim Schäfer, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 881 days.

(21) Appl. No.: 12/439,607

(22) PCT Filed: Sep. 26, 2006

(86) PCT No.: PCT/EP2006/009316
§ 371 (c)(1),
(2), (4) Date: Dec. 8, 2009

(87) PCT Pub. No.: WO2008/025372
PCT Pub. Date: Mar. 6, 2008

(65) Prior Publication Data
US 2010/0089048 A1    Apr. 15, 2010

(30) Foreign Application Priority Data
Aug. 28, 2006    (DE) .......................... 10 2006 040 203

(51) Int. Cl.
*F01B 29/08*    (2006.01)
(52) U.S. Cl.
USPC .................................. 60/632; 60/516; 60/407
(58) Field of Classification Search
USPC ............................ 60/407–412, 632, 633, 516
See application file for complete search history.

(56) References Cited

U.S. PATENT DOCUMENTS

| | | | | |
|---|---|---|---|---|
| 3,971,213 A | * | 7/1976 | Kelley | ............................ 60/372 |
| 4,616,476 A | * | 10/1986 | Oneyama et al. | ............... 60/414 |
| 4,939,899 A | * | 7/1990 | Holzhauer et al. | ............. 60/412 |
| 6,357,162 B1 | * | 3/2002 | Torngren | ............................ 43/4 |
| 6,513,617 B2 | | 2/2003 | Sasaki et al. | |
| 7,607,491 B2 | * | 10/2009 | Sorric et al. | .................... 173/90 |
| 8,196,507 B2 | | 6/2012 | Schaefer et al. | |
| 2012/0204562 A1 | | 8/2012 | Schaefer et al. | |

FOREIGN PATENT DOCUMENTS

| | | |
|---|---|---|
| DE | W10828 C | 3/1956 |
| DE | 29923189 U1 | 8/2000 |
| DE | 10136340 A1 | 3/2002 |
| DE | 10056598 A1 | 5/2002 |

(Continued)

OTHER PUBLICATIONS

European Patent Office, International Search Report for PCT Application No. PCT/EP2006/009316, dated Jun. 1, 2007.

(Continued)

*Primary Examiner* — Hoang Nguyen
(74) *Attorney, Agent, or Firm* — Ingrassia Fisher & Lorenz, P.C.

(57) ABSTRACT

A pneumatic actuator includes, but is not limited to a pressurized gas source, a cylinder, and a piston which is moveable between a rest position and an extended position. Together with the cylinder, the piston borders a first working chamber which is connected with the pressurized gas source via a first inlet opening and which can be pressurized with a first portion of the pressurized gas of the pressurized gas source for moving the piston out of the rest position, and a second working chamber which is connected with the pressurized gas source via a second inlet opening for moving the piston into the rest position and which can be pressurized in a delayed manner with a second portion of the pressurized gas.

17 Claims, 5 Drawing Sheets

(56) References Cited

FOREIGN PATENT DOCUMENTS

| DE | 20214904 | U1 | 2/2003 |
| DE | 10301401 | A1 | 2/2004 |
| DE | 10261870 | A1 | 7/2004 |
| DE | 10305685 | A1 | 9/2004 |
| DE | 202004009772 | U1 | 9/2004 |
| DE | 10343106 | A1 | 10/2004 |
| DE | 20320551 | U1 | 10/2004 |
| DE | 102004037060 | A1 | 3/2006 |
| DE | 102006008900 | A1 | 8/2007 |
| GB | 1182262 | A | 2/1970 |
| GB | 2379194 | A | 3/2003 |
| GB | 2420532 | A | 5/2006 |

OTHER PUBLICATIONS

German Patent Office, German Search Report for Application No. 102006040203.0, dated May 11, 2007.

* cited by examiner

ACTUATOR FOR AN ACTIVE HOOD

CROSS-REFERENCE TO RELATED APPLICATIONS

This application is a U.S. National-Stage entry under 35 U.S.C. §371 based on International Application No. PCT/EP2006/009316, filed Sep. 26, 2006, which was published under PCT Article 21(2) and which claims priority to German Application No. 102006040203.0, filed Aug. 28, 2006, which are all hereby incorporated in their entirety by reference.

TECHNICAL FIELD

The present invention relates to a pneumatic, in particular to a pyrotechnic actuator for an active hood of a motor vehicle.

BACKGROUND

As an active hood, a hood is to be understood which, at an accident, is lifted automatically by means of one or more actuators to increase the distance between the hood and the parts of the vehicle which are difficult to deform so as to potentially provide an extended braking distance for a pedestrian impinging on the hood. Thus, it is intended to prevent that the pedestrian hits the non-deformable bodywork parts with a speed that can result in vital injuries.

Different pneumatic, in particular, pyrotechnic actuators have already been proposed to be used for this purpose such as the gas inflators, as they are known from air bags, to actuate the hood movement. These actuators have an advantageously short reaction time since they are generally electrically ignited and hence do not have to accelerate massive parts in a time-consuming manner for their activation, and they achieve a strong acceleration of the hood so that the latter reaches its lifted position in the shortest possible time. However, it is a disadvantage that the conventional actuators of this type are not reversible. This means, they are good for a single usage only and have to be replaced subsequently. A faulty activation of the actuators thus requires each time an expensive visit to the repair shop. Since it is hardly possible to avoid an activation of the actuators at an accident in case the hood is not affected by the accident, the repair costs after an accident for a vehicle equipped with pyrotechnic actuators are normally higher than the ones for a vehicle that does not have these actuators.

A further problem of the conventional pneumatic actuators is that, caused by their actuation, the stable support of the hood on the bodywork in its normal position is lost. After the actuation of the actuators, the hood is either loosely movable with respect to the bodywork and within the cylinder stroke of the actuators, or it is trapped in the lifted position. In both cases, to proceed driving after actuation of the actuators is afflicted with considerable safety risks, even if the vehicle, apart from that, is not substantially damaged, so that it is normally required to call qualified personnel to restart the vehicle.

Hence, there is a demand for a pneumatic actuator for an active hood which is capable, after an actuation, to move the hood automatically back into the normal position so that the roadworthiness of the vehicle can not be affected by the hood actuation alone.

SUMMARY

In view of the foregoing, at least one object is solved in that in a pneumatic actuator comprising a pressurized gas source and a piston moveable between a rest position and an extended position, which piston borders together with the cylinder a first working chamber which is connected with a pressurized gas source and which can be pressurized with a first portion of the pressurized gas of the pressurized gas source for moving the piston out of the rest position, a second working chamber for moving the piston into the rest position can be pressurized with a second portion of the pressurized gas of the pressurized gas source. In other words, in the actuator according to the invention, the pressurized gas of the pressurized gas source is successively used for lifting the active hood and subsequently for a movement of the hood back into the normal position.

The pressurized gas source can comprise at least one pyrotechnical gas inflator. These gas inflators, which are also used for air bags, can supply large amounts of gas with high pressure and with minor switching delay.

To cause the delay between pressurizing the cylinder with the first portion or the second portion, respectively, of the pressurized gas, two pyrotechnic gas inflators for generating the first or the second portion, respectively, of the pressurized gas can be provided, which are ignited one after the other.

According to a second development, a delay element is provided in a line extending from the pressurized gas source to the second working chamber. This delay element allows using a single pyrotechnic gas inflator for the generation of the first as well as the second portion of the pressurized gas.

The delay element can be formed in a simple manner substantially by means of an accumulator volume which is connected via a first valve with the pressurized gas source and via a second valve with the second working chamber.

The first valve is preferably a pressure-controlled one-way valve which allows the second portion of the pressurized gas to enter the second working chamber without the need of an external control signal.

The second valve is preferably an electrically controlled switching valve which, at an appropriate time, preferably with a predefined delay after igniting the pyrotechnic gas inflator, lets the gas pass from the accumulator volume into the second working chamber.

A closing body of the second valve can be actuated by an electro-magnet, or an element which changes its shape temperature-dependent such as a bimetal element, or a memory alloy element. When using a bimetal element and, in particular, a memory alloy element, the required delay for opening the valve can be a result of the fact that the bimetal or the memory alloy element, respectively, when exposed to heating current or heating in any other manner, needs a certain time to reach a temperature at which the valve opens.

Preferably, the element that changes its shape temperature-dependent can be heated up by the heat of the pressurized gas to the temperature needed for opening the valve.

The needed accumulator volume can be formed in a simple manner by means of pipe extending between the valves. Here, the valves are arranged advantageously adjacent to opposite ends of the cylinder.

The delay element is advantageously set to open the second valve not before the piston has reached the maximal extended position. The energy of the second portion of the pressurized gas is hence not used for dampening the lifting of the hood but exclusively for actuating the movement of the piston back into the rest position.

To prevent that, towards the end of the piston movement, a disadvantageously high counter pressure builds up in the two working chambers downsized by the movement, it can be provided that the first and/or the second working chamber communicates through a throttling point with the surrounding area.

According to a further preferred development, the first and the second valve can be combined in a directional control valve, by means of which, in a first state of the directional control valve, the accumulator volume communicates with the pressurized gas source and, in a second state, communicates with the second working chamber.

The piston is preferably lockable in the rest position.

A locking of the piston can then advantageously be released by applying pressurized gas.

In case of using a directional control valve, as mentioned above, a closing body of the directional control valve can advantageously serve at the same time as a lock for the locking of the piston.

The piston is advantageously unlocked while the directional control valve is in the above mentioned first or second state, respectively. In a third state of the directional control valve, in which the piston is locked, the first working chamber is advantageously shut off from the pressurized gas source to prevent a pressure build-up therein which could make the unlocking difficult.

According to a particularly preferred development, the cylinder has in a middle region a larger inner width than in at least one of its end regions. This results in that during the movement of the piston out of the rest position, a portion of the pressurized gas supplied into the working chamber can flow past the piston forming a gas cushion on the opposite side thereof which softly dampens the piston movement shortly before reaching the maximal lifted position. In this manner, excessive oscillatory movements of the lifted hood, which could affect the protective effect of lifting the hood, are prevented.

Also subject matter of the invention is a motor vehicle with an active hood which is secured at a frame of the vehicle body by means of actuators as defined above.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
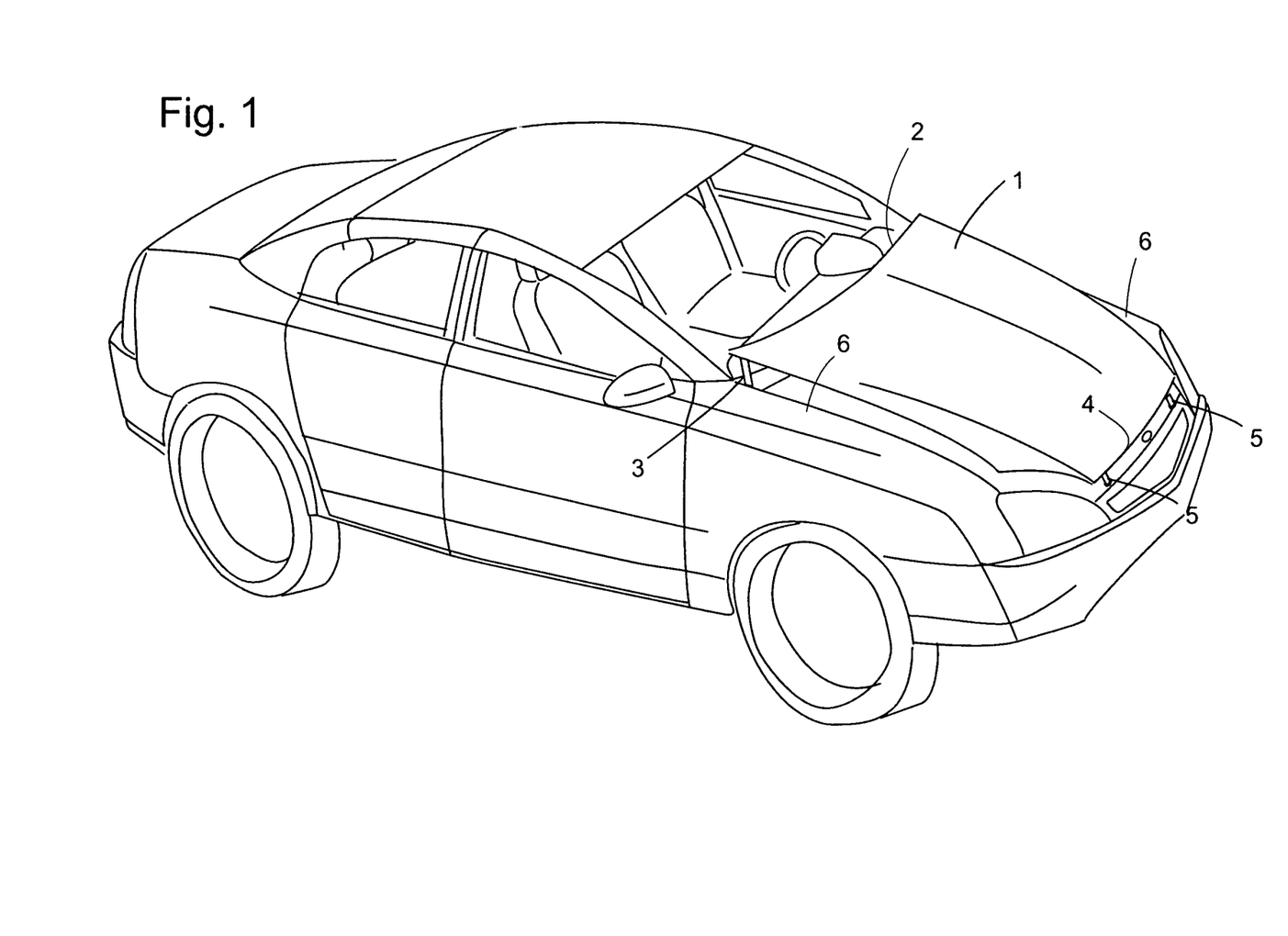
FIG. 1 shows a motor vehicle with a hood held by actuators in a lifted position.

FIG. 1 shows schematically a motor vehicle with an engine hood 1 which is held by actuators 5, 3 arranged adjacent to the front or rear edge, respectively, of the hood 4, 2 in a lifted position with respect to the normal position in which the hood is flush with the adjacent bodywork parts 6. The hood 1 is supported exclusively by the actuators 3, 5.

Figures 2, 3, 5:
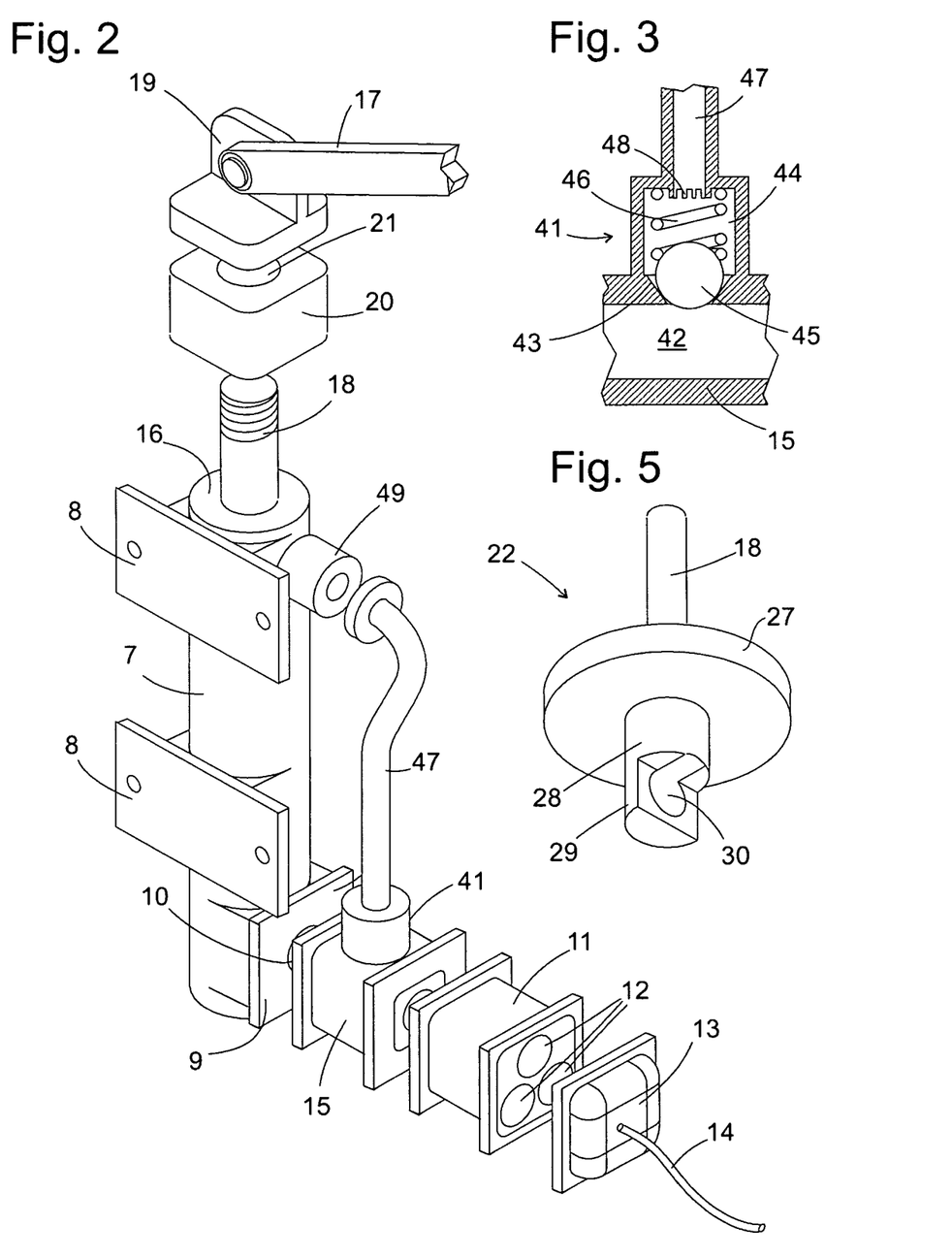
FIG. 2 shows a perspective exploded view of an actuator according to an embodiment of the invention.
FIG. 3 shows a cross section of an inlet-side valve of a delay element.
FIG. 5 shows the piston of the actuator.

FIG. 2 shows a perspective exploded view of one of the two actuators 3. The actuator comprises an elongated cylinder 7 which carries two mounting flanges 8 for mounting the cylinder 7 to a rigid frame of the motor vehicle.

A piston rod 18 coming out at the cylinder cover 16 of the cylinder 7 is provided at its tip with a thread. The thread is provided to be screwed into a hinge carrier 19 to which a steering rod, or in the preferred case of a single-joint hinge, a hinge part 17 is hinged, which is fixedly attached to the hood 1. A buffer piece 20 made of hard rubber or a different, slightly elastically deformable material having a central bore 21 is provided to be put on the piston rod 18 and to be clamped in the rest position of the actuator between the hinge carrier 19 and the cylinder cover 16 and to be deformed. For this, the piston rod 18 is locked in a resting state within the cylinder 7, as will be described hereinafter in more detail. The deformation of the buffer piece 20 is strong enough to generate a reset force of the buffer piece 20, which is higher than any force acting on the hood 1 under normal operational conditions, during driving, or during opening or closing the hood 1. Thus, under normal operational conditions, no additional deformation of the buffer piece 20 takes place, that is, the hinge carrier 19 is actually unmovable with respect to the cylinder 7 and the bodywork carrying the cylinder.

At a lower end of the cylinder 7, a gas inlet flange 9 with an inlet opening 10 is arranged. A gas inflator carrier 11 is provided to be attached gas-tight to the inlet flange 9 by means of a branching piece 15. The gas inflator carrier 11 has chambers for three gas inflators 12 which are connected with the inlet opening 10. In a passage between each chamber and the branching piece 15, one destroyable separating wall, respectively, which is not shown in the figure, can be placed within the gas inflator 11, wherein the separator wall breaks open when the gas inflator 12 is ignited within the chamber assigned to this separator wall, but also protects a gas inflator 12 which is housed in a chamber assigned to this separator wall against being ignited by the explosion of a gas inflator 12 in an adjacent chamber.

A cover 13 to be mounted on the gas inflator carrier's 11 side facing away from the cylinder 7 contains an electronic ignition circuit which ignites upon each receipt of an ignition command one of the gas inflators 12 via a signal cable 14.

The actuator of FIG. 2 is hence capable to actuate three lifting movements of the hood 1 before it is used up and has to be replaced.

It is obvious that it is also possible that more or less than three gas inflators 12 can be housed within the gas inflator carrier 11. In general, the number of gas inflators will not be higher than five or six since the number of expected hood lifting movements during the service life of a motor vehicle is limited.

Basically, also considered could be a gas inflator carrier with a single gas inflator which then would have to be replaced after each lifting of the hood 1 while the cylinder itself could remain within the vehicle. A replacement of the gas inflator carrier, which would be required after each lifting of the hood 1, however, would require considerable safety measures which are difficult to ensure in a car repair shop.

The branching piece 15 has three connections, one of which is connected with the gas inflator carrier 11, the second one is connected with the inlet opening 10 of the first gas inlet flange 9, and the third one is connected with the one-way valve 41. FIG. 3 shows a schematic cross section of the branching piece 15 and the one-way valve 41. Into the wall of a line section 42 which connects the gas inflator carrier 11 with the inlet opening 10, a conical passage 43 is drilled which leads into a valve chamber 44. Housed within the valve chamber 44 are a ball 45 and a coil spring 46 which presses the ball 45 tightly into the conical passage 43. A pipe 47 extends from the valve chamber's 44 end opposing the passage 43. To rule out that the ball 45 is tightly pressed against the inlet of the pipe 47, the inlet is formed as a short slotted port 48.

Pipe 47 extends, as shown in FIG. 2, to an inlet opening of a second valve 49, here a solenoid valve, which normally keeps a second inlet opening closed on the upper end of the cylinder 7.

Figure 4:
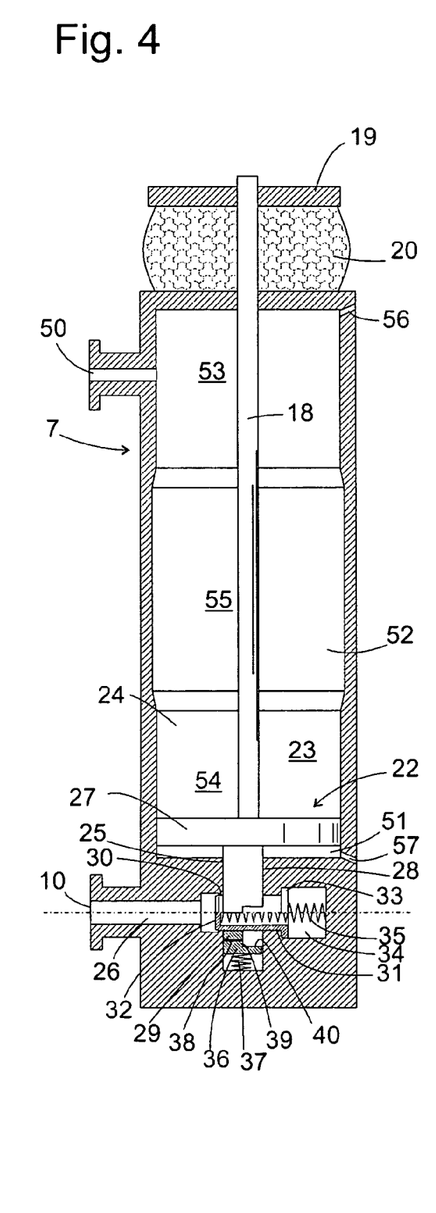
FIG. 4 shows a schematic cross section of the actuator of FIG. 2 in the locked state.
Figure 6:
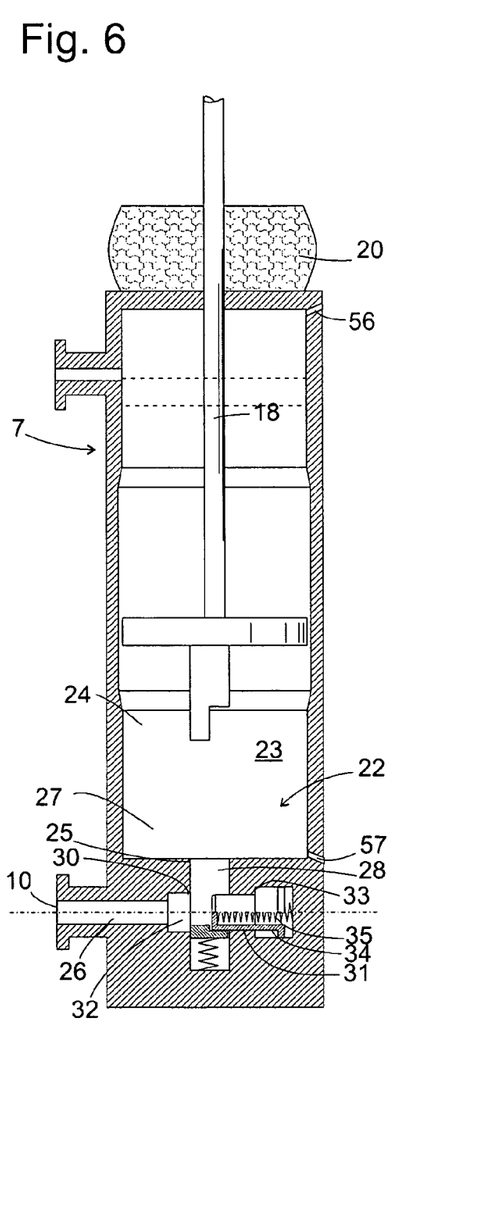
FIG. 6 shows the actuator in the unlocked and partially lifted state.

FIG. 4 shows the cylinder 7 of FIG. 2 in an axial cross-sectional view. An internal chamber 23 of the cylinder 7 is divided into a main chamber 24 and a prechamber 25 which both have a cylindrical shape and are arranged coaxial to each other. The free diameter of the prechamber 25 arranged in the lower region of the cylinder is considerably smaller than the one of the main chamber 24. A bore 26 extends between the prechamber 25 and the first inlet opening 10. The inlet opening 50 blocked by the second valve 49 leads directly into the upper region of the chamber 23.

The piston rod 18 is linked to a piston 22 which, in its rest position shown in the figure, is located at the lower end of the chamber 23. The piston 22 shown in FIG. 5 in a perspective view comprises a piston plate 27 which covers the cross section of the main chamber 24 and divides the same into a lower and an upper working chamber 51 or 52, respectively, and a bolt 28 projecting from the piston plate 27 downwards into the prechamber 25. In an upper region of the prechamber 25, between the junction of bore 26 with the prechamber 25 and the main chamber 24, the bolt 28 covers the cross section of the prechamber 25. A tip 29 of the bolt 28 has a semi-cylindrical cross section and abuts with it's curved outside closely against the wall of the prechamber 25 and around the junction of bore 26. A bore 30 aligned with the bore 26 penetrates the tip 29 of the bolt 28.

A lock 31, which is shown in the figure half in a side view and half in a cross-sectional view, is displaceably received within the bore 30. A front end 32 of the lock 31 engages with the bore 26. A ring flange 33 projecting at the opposing rear end of the lock 31 is displaceably received within a chamber 34, which is formed at the prechamber's 25 side diametrically opposing the bore 26. A compression spring 35 housed in the chamber 34 keeps the lock 31 in the shown position in which the ring flange 33 abuts against a shoulder of the chamber 34.

At the bottom of the prechamber 25, below the tip 29 of the bolt 28, a retaining element 36 is arranged. The retaining element 36 has a stepped upper side with a first horizontal pressing face 38 which, in the shown configuration, is pressed against the tip 29 by means of a compression spring 37, and a vertical pressing face 39 as well as a further horizontal pressing face 40, the function of which is described in connection with the unlocking process and the reversing of the actuator.

In case of actuation of the actuator, pressurized gas from the gas generator 12 penetrates into the bore 26 and pushes against the front side 32 of the lock 31. The lock 31 draws back under the pressure until it exits the bore 30 within the bolt 28. Now, the gas flows freely through the bores 26, 30 into the prechamber 25 and acts on the lower side of the bolt 28. The piston 22 draws back under the pressure of the gas in upward direction since the piston is unlocked after the exit of lock 31 out of the bore 30. Simultaneously with the piston 22, the retaining element 36 moves upwards under the pressure of the spring 37 until it is stopped by means of the contact of the horizontal pressing face 40 with the lock 31.

As soon as the tip 29 of the bolt 28 begins to leave the prechamber 25, pressurized gas flows from the prechamber 25 into the main chamber 24 and acts on the entire cross-sectional area of the piston 22, thereby driving the piston upwards with high force.

The main chamber 24 is divided into a top and a bottom section 53 and 54, respectively, wherein their inner diameter corresponds to the diameter of the piston plate 27 so that the piston plate 27 is substantially closely guided in these sections 53, 54 along the walls of the cylinder, and a middle section 55, the inner width of which is slightly larger than the one of the top and bottom sections 53, 54. When the piston 22, after the unlocking and under the pressure of the gas flowing into the lower working chamber 51, reaches the middle section 55, pressurized gas can flow past the edges of the piston plate 27 into the upper working chamber 52. Later, when the piston plate 27 reaches the top section 53, the gas flown into the upper working chamber 52 is compressed therein and decelerates the piston 22 so that an abrupt impact of the piston plate 27 against the upper face wall of the cylinder 7 is prevented. In this manner, the piston 22 is progressively decelerated when it approaches the upper end position of the cylinder, and an abrupt deceleration, which could initiate strong vibrations of the engine hood 1, is prevented. A throttling point 56 serves also for vibration dampening, through which throttling point, the gas compressed by means of the upward movement of the piston 22 can escape to the outside. The throttling point 56 is illustrated here as a small bore at the upper end of the cylinder 7; however, it can also be a fit between cylinder cover 16 and piston rod 18, wherein the fit is intentionally designed to leak. A corresponding throttling point 57 is arranged at the lower end of the main chamber 24.

While the gas flows into the lower working chamber 51 and drives the piston 22 upwards, its pressure is still high enough to lift the ball 45 from its seat 43. The gas flow from the gas inflator 12 is hence divided within the branching piece 15, at least temporarily, into a first portion which flows into the lower working chamber 51, and a second portion which passes the ball 45 and penetrates into the valve chamber 44 and into the pipe 47 attached thereto. The flow of gas into the pipe 47 stops as soon as the gas pressure has increased to a point that the pressure difference between the line section 42 and the pipe 47 is not sufficient any more to keep the valve 41 open. Towards the end of the lifting movement of the engine hood 1, the pressure in the line section 42 can even fall below the one in pipe 47; since the pressure in pipe 47 presses the ball 45 against its seat 43, there is no backflow of pressurized gas into the line section 42.

The electronic control circuit, which previously has ignited the gas inflator 12, controls, with a predetermined delay after the ignition point, the second valve 49 to open it so that pressurized gas accumulated in the pipe 47 can flow through the second inlet opening 50 into the upper working chamber 52 of the cylinder 7. The time delay between the ignition of the gas inflator 12 and the opening of the second valve 49 is long in comparison to the time the piston 22 needs to reach its highest position. Thus it is ensured that, through the throttling points 56, 57, the pressure in the working chambers 51, 52 has decreased already to nearly atmospheric pressure before the gas stored in the pipe is allowed to enter into the upper working chamber 52.

The over-pressure resulting herefrom in the upper working chamber 52 drives the piston 22 downwards again in direction of it's previously held locked position. The bolt 28 penetrates again under the pressure of the gas in the upper working chamber 52 into the prechamber 25 thereby abutting against the retaining element 36. By pushing the retaining element 36 back in downward direction, the piston 22 clears the way for the lock 31 so that the same can engage again with the bore 29 of the bolt 28. When this happens, the piston 22 is fully locked again at the cylinder 7, and, together with the piston 22, also the engine hood mounted to the piston rod 18 is secured again with respect to the bodywork.

In case the actuator is actuated at a minor accident which does not affect the roadworthiness of the vehicle, the engine hood 1 fully automatically returns into precisely the same secured condition which it had prior to the accident, and the vehicle can be driven again without concerns with regard to the safety of the hood 1.

Instead of the solenoid valve, valve types which are controlled in a different manner can also be used as the second valve 49 to ensure the delayed flow of the gas into the upper working chamber 52. Thus, for example, the movement of a closing element of the valve can be actuated by means of an electrically heatable bimetal element. In a valve construction in which the closing element is movable to a certain degree without opening the valve, from the time when the gas inflator 12 is ignited, such a bimetal element can be exposed to a low heating current which is rated in such a manner that, with a desired delay, the bimetal reaches a degree of deformation at which the valve opens. Of course, the bimetal element can also be exposed to a high heating current which is delayed in an electronic manner with respect to the ignition time and which brings the bimetal to a temperature required for opening the valve without significant delay. However, preferred over bimetal elements are elements made from a memory alloy since they are not continuously changing their shape dependent on the temperature like a bimetal, but have a phase transition temperature at which they change rather abruptly from a low temperature shape to a high temperature shape. Also the memory alloy elements can selectively be exposed to a low heating current which is undelayed with respect to the ignition of the gas inflator 12 and which results in a deformation only after certain time period, or to a heating current which is delayed with respect to the ignition but, on the other hand, is higher.

According to an advantageous development, the bimetal or the memory alloy element of the second valve 49 is arranged in thermal contact with the hot pressurized gas coming from the gas inflator 12 in such a manner that it opens after a delay time required for heating the element. An electric heating can be eliminated which simplifies the electronic control circuit and improves the interference resistance of the actuator.

Figure 7:
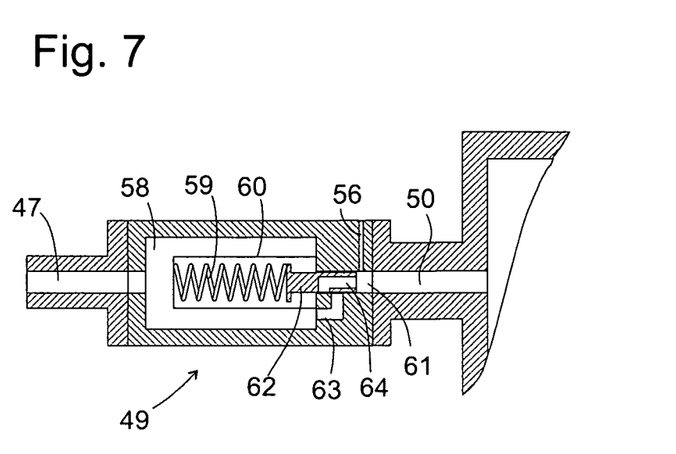
FIG. 7 shows the cross section of an outlet-side valve of a delay element.

A second valve 49 of this type is shown in a sectional view in FIG. 7. An inner cavity 58 of the valve communicates with the pipe 47. A spring 59 made from a memory alloy is arranged within the cavity 58 so that the spring can be heated by means of a pressurized gas penetrating into the cavity 58. The spring 59 is enclosed in a pressure-resistant capsule 60 which prevents that a slider 62, which is kept by the spring 59 in a bore 61 communicating with the second inlet opening 50, is displaced by pressurized gas which flows into the cavity 58 at ignition of the gas inflator 12. The throttling point 56 is not designed here as a bore in the cylinder 7 but extends from the bore 61 to the outside. An angled passage 63 connects the cavity 58 with the bore and is closed in the shown configuration by the slider 62. When the spring 59 is sufficiently heated, it expands so that the pressurized gas can flow through the passage 63 and a passage 64 of the slider 62 to the second inlet opening 50.

Instead of dividing the gas flow of a single gas inflator, as in the construction shown in FIG. 2, to supply the portions one after the other to the working chambers 51, 52, the branching piece 15 and the pipe 47 can also be eliminated, and, instead of that, one assembly, respectively, including the above described components 10 to 14, can be mounted to each of the first inlet opening 10 and the second inlet opening 50. By actuating the two assemblies by means of a control circuit with a suitable time offset, the lifted hood 1 can be lowered again and can be locked in the lowered state.

Also conceivable is a design in which the chamber 23 of the cylinder is not divided into a main chamber and a prechamber, and the bolt 28 is eliminated, and, instead of that, a bore, which is homologous to the bore 30, is formed in the piston plate 27 itself.

Figure 8:
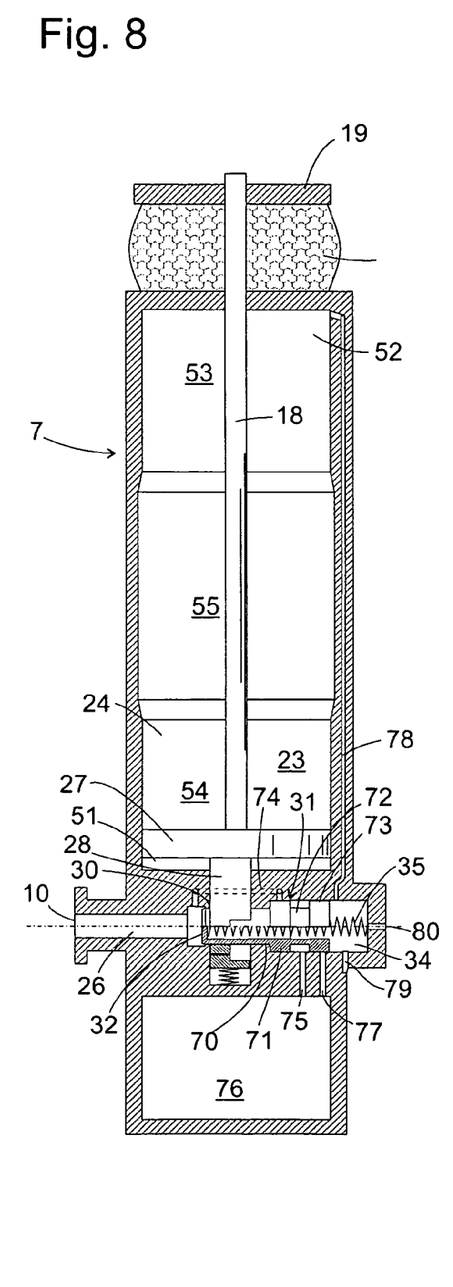
FIG. 8 shows a cross section analog to FIG. 4 of the locked actuator according to a second development.
Figure 9:
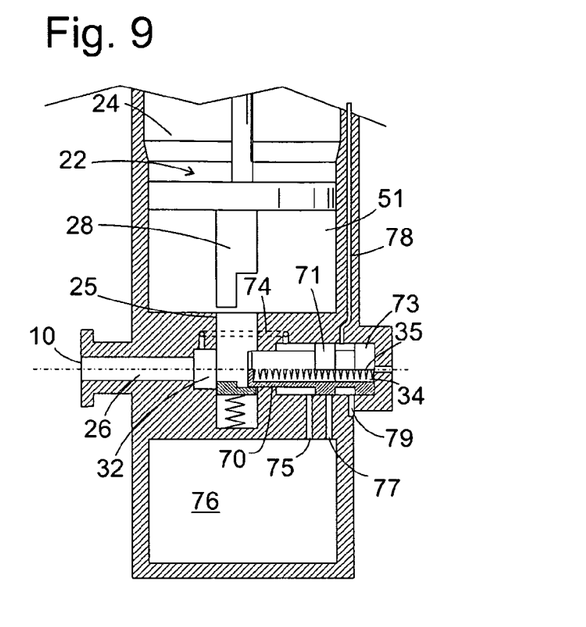
FIG. 9 shows a partial cross section of the actuator of the second development during a lifting movement of the piston.
Figure 10:
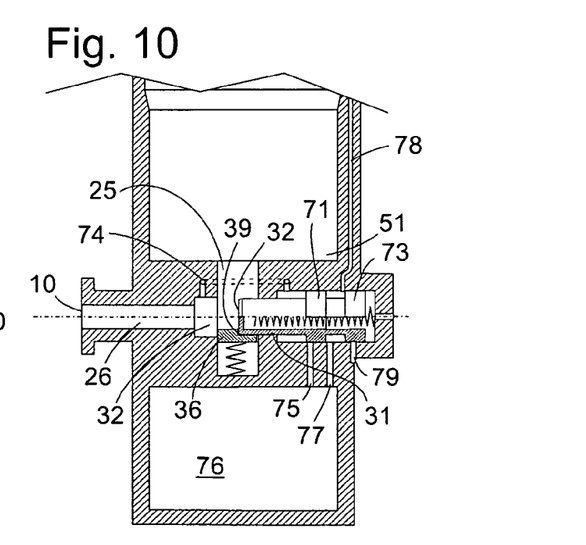
FIG. 10 shows a partial cross section analog to FIG. 9 of the actuator during a downward movement of the piston.

A further design of the actuator according to the invention is now described by means of the FIG. 8 to FIG. 10, wherein components of the actuator, which are similar to the ones of the design illustrated with respect to the FIG. 1 to FIG. 7, are denoted by the same reference numbers. In particular, the chamber 24 of the cylinder 7, with the differently wide sections 53, 54, 55, and the shape of the piston 22 movable therein with the piston plate 27 and the drilled-through bolt 28, is the same as described with reference to the FIG. 4 to FIG. 6.

The lock 31 is composed of a pin 70 which is facing towards the inlet opening 10 and which, in the configuration of FIG. 8, penetrates the bolt 28, thereby keeping the piston 22 locked, and of annular sections 71, 72, 73 which are adjacent to the pin 70, wherein the two larger ones 71, 73 of which abut closely with their circumferential surfaces against the wall of the cylindrical chamber 34, while the intermediate narrower ring section 72 together with the wall of the chamber 34 borders an annular cavity. A line 74 branching off from the bore 26 leads into the chamber 34 at a position blocked by the ring section 71. The ring space surrounding the section 72 is connected by means of a line 75 with an accumulator chamber 76 which is shown here for a clearer illustration in axial extension of cylinder 7, but which in practice is arranged primarily alongside the cylinder 7 to keep the installation height of the actuator small. A further line 77 extending between the accumulator chamber 76 and the chamber 34 is blocked by the ring section 73. An area of the chamber 34 which is facing away from the pressurized gas inlet 10 is connected with the upper working chamber 52 by means of a line 78. Two passages 79, 80 lead from the chamber 34 to the outside.

When at actuation of the actuator, pressurized gas penetrates into the bore 26, at first it can not get through the line 74 into the chamber 34 since the line 74 is blocked by the ring section 71. By means of the gas pressure acting on the front end 32 of the lock 31, the lock 31 is pushed back until, as shown in FIG. 9, the rearmost ring section 73 abuts against the chamber 34 and the compression spring 35 is maximal compressed. In this position, the pin 70 is pulled out of the bore 30 of the bolt 28 so that the pistons 22, as illustrated with reference to FIG. 6, moves upwards, and, at the same time, in the chamber 34, separated by the ring section 71, two ring spaces are formed, the one of which connects the lines 74, 75 and the other one connects the line 78 with the passage 79. Thus, on the one hand, pressurized gas from the bore 26 gets into the accumulator chamber 76, and air pushed out of the upper working chamber 52 by means of the movement of the piston 22 flows through line 78 and the passage 79 to the outside.

When the gas pressure in the bore 26 decreases after executed lifting of the hood 1, the spring 35 pushes the lock 31 again towards the pressurized gas inlet 10 until the movement of the lock 31 comes to a stop by means of the contact of the lock's front end with the pressing surface 39 of the retaining element 36. In this position, shown in FIG. 10, the ring section 71 blocks the line 75, and the ring section 73 blocks the passage 79, whereas the lines 77, 78 communicate with each other. Thus, the pressurized gas stored in the phase of FIG. 9 in the accumulator chamber 76 flows into the upper working chamber 52 and drives the piston 22 back downwards until the piston's bolt 28 finally engages again with the prechamber 25, and pushes the retaining element 36 back, and finally the lock 31, driven by the compression spring 35, penetrates again into the bore 30. With that, the actuator is ready for a new actuation without a maintenance access being required here.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

REFERENCE LIST

Engine hood 1
Edge 2
Actuator 3
Edge 4
Actuator 5
Bodywork part 6
Cylinder 7
Mounting flange 8
Gas inlet flange 9
First inlet flange 10
Gas inflator carrier 11
Gas inflator 12
Cover 13
Signal cable 14
Branching piece 15
Front side 16
Hinge part 17
Piston rod 18
Hinge carrier 19
Buffer piece 20
Piston 22
Chamber 23
Chamber 24
Prechamber 25
Bore 26
Piston plate 27
Bolt 28
Tip 29
Bore 30
Lock 31
Front end 32
Ring flange 33
Chamber 34
Compression spring 35
Retaining element 36
Compression spring 37
Pressing face 38, 39, 40
One-way valve 41
Line section 42
Seat 43
Valve chamber 44
Ball 45
Coil spring 46
Pipe 47
Port 48
Solenoid valve 49
Second inlet opening 50
Lower working chamber 51
Upper working chamber 52
Top section 53
Bottom section 54
Middle section 55
Throttling point 56, 57
Inner cavity 58
Spring 59
Capsule 60
Bore 61
Slider 62
Passage 63
Passage 64
Pin 70
Ring section 71, 72, 73
Line 74, 75
Accumulator chamber 76
Line 77, 78
Passages 79, 80

The invention claimed is:

1. A pneumatic actuator, comprising:
a pressurized gas source;
a cylinder having a top section, a bottom section and a middle section between the top section and the bottom section, with an inner width of a chamber of the middle section larger than an inner width of a first working chamber of the bottom section and a second working chamber of the top section, with the bottom section including a prechamber adjacent to the first working chamber, the inner width of the prechamber smaller than an inner width of the first working chamber; and
a piston moveable between a rest position and an extended position, the piston borders with the cylinder at the first working chamber in the bottom section which is connected with the pressurized gas source by the prechamber that is in communication with a fluid inlet opening, which is pressurizable with a first portion of a pressurized gas of the pressurized gas source for moving the piston out of the rest position, the piston having a piston plate and a bolt extending outwardly from the piston plate into the prechamber when the piston is in the rest position, the cylinder including a lock that engages the bolt of the piston to lock the piston in the rest position, and a portion of the pressurized gas flows past edges of the piston plate into the second working chamber when the piston is in the middle section of the cylinder to progressively decelerate the piston,
wherein the second working chamber in the top section of the cylinder for moving the piston into the rest position is connected with the pressurized gas source and is pressurizable in a delayed manner with a second portion of the pressurized gas thereof.

2. The pneumatic actuator according to claim 1, wherein the pressurized gas source comprises three pyrotechnic gas inflators to enable only three movements of the piston from the rest position into the extended position.

3. The pneumatic actuator according to claim 1, wherein a delay element is inserted into a pressurized gas line which connects the pressurized gas source with the second working chamber.

4. The pneumatic actuator according to claim 3, wherein the delay element comprises an accumulator volume which is connected with a first valve with the pressurized gas source and with a second valve with the second working chamber.

5. The pneumatic actuator according to claim 4, wherein the first valve is a pressure-controlled one-way valve.

6. The pneumatic actuator according to claim 4, wherein the second valve is an electrically controlled switching valve.

7. The pneumatic actuator according to claim 6, wherein a closing element of the second valve is actuated by an electromagnet.

8. The pneumatic actuator according to claim 6, wherein a closing element of the second valve is actuated by an element which changes a shape dependent on a temperature.

9. The pneumatic actuator according to claim 8, wherein the element which changes the shape dependent on the temperature is heated by the pressurized gas to a temperature required for opening the second valve.

10. The pneumatic actuator according to claim 4, wherein the accumulator volume is formed by a pipe extending between valves arranged adjacent to opposing ends of the cylinder.

11. The pneumatic actuator according to claim 4, wherein the delay element is set to open the second valve only after the piston has reached a maximal extended position.

12. The pneumatic actuator according to claim 1, wherein at least one of the first working chamber or the second working chamber communicates with a surrounding area by a throttling point.

13. The pneumatic actuator according to claim 3, wherein the delay element comprises an accumulator volume and a directional control valve where, in a first state of the directional control valve, the accumulator volume communicates with the pressurized gas source, and, in a second state, communicates with the second working chamber.

14. The pneumatic actuator according to claim 1, wherein locking the piston in the rest position can be released by applying the pressurized gas.

15. The pneumatic actuator according to claim 13, wherein a closing element of the directional control valve serves as a lock for the locking of the piston.

16. The pneumatic actuator according to claim 15, wherein the piston is unlocked in the first state and the second state of the directional control valve.

17. The pneumatic actuator according to claim 16, wherein in a third state of the directional control valve, the piston is locked and the first working chamber is cut off from the pressurized gas source.

* * * * *